United States Patent
Hongu et al.

(10) Patent No.: US 6,768,761 B2
(45) Date of Patent: Jul. 27, 2004

(54) GAS LASER OSCILLATOR

(75) Inventors: Hitoshi Hongu, Hyogo (JP); Hiroyuki Hayashikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 91 days.

(21) Appl. No.: 09/795,084

(22) Filed: Mar. 1, 2001

(65) Prior Publication Data

US 2001/0022797 A1 Sep. 20, 2001

(30) Foreign Application Priority Data

Mar. 2, 2000 (JP) ........................................ 2000-056805

(51) Int. Cl.[7] .............................................. H01S 3/223
(52) U.S. Cl. ........................................ 372/55; 372/58
(58) Field of Search .............................. 372/55, 58, 59

(56) References Cited

U.S. PATENT DOCUMENTS

| | | | | |
|---|---|---|---|---|
| 4,589,123 A | * | 5/1986 | Pearlman et al. | 378/106 |
| 4,975,252 A | * | 12/1990 | Nishizawa et al. | 118/688 |
| 5,631,917 A | * | 5/1997 | Ogawa et al. | 372/35 |
| 6,151,350 A | * | 11/2000 | Komori et al. | 372/59 |

FOREIGN PATENT DOCUMENTS

| | | | | |
|---|---|---|---|---|
| JP | 402112292 A | * | 4/1990 | |
| JP | 2-280391 | * | 11/1990 | |
| JP | 09-266342 | * | 10/1997 | ........... H01S/3/134 |
| JP | 11-87809 | * | 3/1999 | |

* cited by examiner

Primary Examiner—Don Wong
Assistant Examiner—Hung Tran Vy
(74) Attorney, Agent, or Firm—Wenderoth, Lind & Ponack, L.L.P.

(57) ABSTRACT

A gas laser oscillator comprising a laser gas pressure controller for controlling the pressure of laser gas in laser gas chamber to be constant, an electromagnetic valve for supplying laser gas into the laser gas chamber from a gas bottle so that the laser gas within the laser gas chamber is maintained constant, detection means for detecting that the cycle period of open/close actions of the electromagnetic valve became longer than a reference value, and an alarm display controller which issues an alarm. In a gas laser oscillator of the present invention, even such a micro vacuum leak that hardly ill-affects the laser output can be detected with ease while the gas laser oscillator is in operation. This makes it possible to apply an appropriate maintenance work beforehand on the vacuum seal. Thus, reliable gas laser oscillators can be offered in accordance with the present invention.

12 Claims, 2 Drawing Sheets

FIG. 3 – PRIOR ART laser gas exhaust

GAS LASER OSCILLATOR

FIELD OF THE INVENTION

The present invention relates to a gas laser oscillator equipped with a constant laser gas pressure system which controls the laser gas pressure to be constant by exhausting and supplying certain amount of laser gas.

BACKGROUND OF THE INVENTION

FIG. 3 shows outline structure of a conventional gas laser oscillator including a constant laser gas pressure system. In the following, a conventional method for controlling the laser gas pressure constant in a gas laser oscillator is described with reference to FIG. 3.

A conventional gas laser oscillator with constant laser gas pressure system comprises a power supply 1 for laser gas excitation by a discharge, a laser gas chamber 2, a vacuum pump 3, a laser gas bottle 4, an electromagnetic valve 5 for laser gas supply, a laser gas pressure sensor 6 for detecting the laser gas pressure within the laser gas chamber 2 and a laser gas pressure controller 7 which opens/closes (i.e performs open-and-close actions) the electromagnetic valve 5 for laser gas supply in order to maintain the pressure constant by comparing the signals detected by the laser gas pressure sensor 6 with a reference value.

The above-description illustrates structure of the constant laser gas pressure system of a conventional gas laser oscillator; in the following, operation of the system is described.

As a general rule among the gas laser oscillators, it is essential to keep laser gas pressure within the laser gas chamber 2 connected with the excitation power supply 1 constant, in order to maintain a stable laser output. Also, in order to prevent decrease of the decrease of output power due to deterioration of the laser gas, new laser gas is supplied continuously, or intermittently, from the laser gas bottle 4 or the like means connected with the gas laser oscillator.

The vacuum pump 3 connected to the laser gas chamber 2 exhausts deteriorated laser gas out of the laser gas chamber 2 as the routine work. When laser gas is exhausted the pressure of laser gas within the laser gas chamber 2 drops, and then the electromagnetic valve 5 for laser gas supply is opened to supply new laser gas into the laser gas chamber 2 from the laser gas bottle 4 connected to the gas laser oscillator. Quantity of the exhaust and that of the supply need to be well balanced; otherwise the pressure within the laser gas chamber 2 can not be kept constant. In order to keep the pressure constant, the laser gas pressure sensor 6 connected to the laser gas chamber 2 detects laser gas pressure within the laser gas chamber 2 and transmits signals of detected results to the laser gas pressure controller 7. The laser gas pressure controller 7 compares the signals of detected results with a reference value, or target value for the laser gas pressure, and opens/closes the electromagnetic valve 5 so that the laser gas pressure is maintained constant. The cycle period of open/close actions is kept stable when a gas laser oscillator is working normally.

The above-configured conventional gas laser oscillator has following drawbacks.

After a long operation period, a gas laser oscillator sometimes exhibits a sudden drop in the laser output, or stops, due to leakage caused by a deteriorated vacuum seal or the like of the laser gas chamber 2 (hereinafter referred to as "vacuum leak"). In most of the cases, the vacuum leak does not take place abruptly, but it starts from a micro leak which hardly affects the laser output and it gradually develops into a leak that matters. Therefore, if the micro leak is detected at an early stage, a certain preventive maintenance measures can be taken to avoid such drop of laser output. Measurement of the vacuum leak has been conducted during the time when a gas laser oscillator is out of duty, using a measuring equipment. Lately, an increasing number of gas laser oscillators are put into operation continuously around the clock. On the other hand, there has been no effective means for detecting the micro vacuum leak applicable to gas laser oscillators at work. Once a sudden drop of laser output actually happens, scheduled maintenance is hardly helpful; in addition, the gas laser oscillator that is out of order is put aside for a considerable length of time before it is repaired. Thus, the inconvenience spreads over a production floor related to the processing with gas laser.

The present invention addresses the above-described problems.

SUMMARY OF THE INVENTION

A gas laser oscillator of the present invention comprises:
a power supply for exciting laser gas by a discharge;
a laser gas chamber for containing the laser gas;
means for exhausting laser gas contained in the laser gas chamber;
a gas pressure sensor for detecting gas pressure in the laser gas chamber;
an electromagnetic valve for supplying laser gas into the laser gas chamber from a gas bottle so that pressure of the laser gas as detected by the gas pressure sensor is maintained constant;
detection means for detecting deviation in a cycle period of open/close actions of the electromagnetic valve from a reference value; and
an alarm display controller for issuing an alarm based on a detection results delivered from the detection means.

A gas laser oscillator of the present invention is also provided with a stop controller, which suspends the excitation of laser gas discharge in a case when the cycle period of open/close actions of the electromagnetic valve becomes longer than a reference value.

BRIEF DESCRIPTION OF THE DRAWINGS

FIG. 3 shows outline structure of a conventional gas laser oscillator.

DESCRIPTION OF PREFERRED EMBODIMENT

Figure 1:
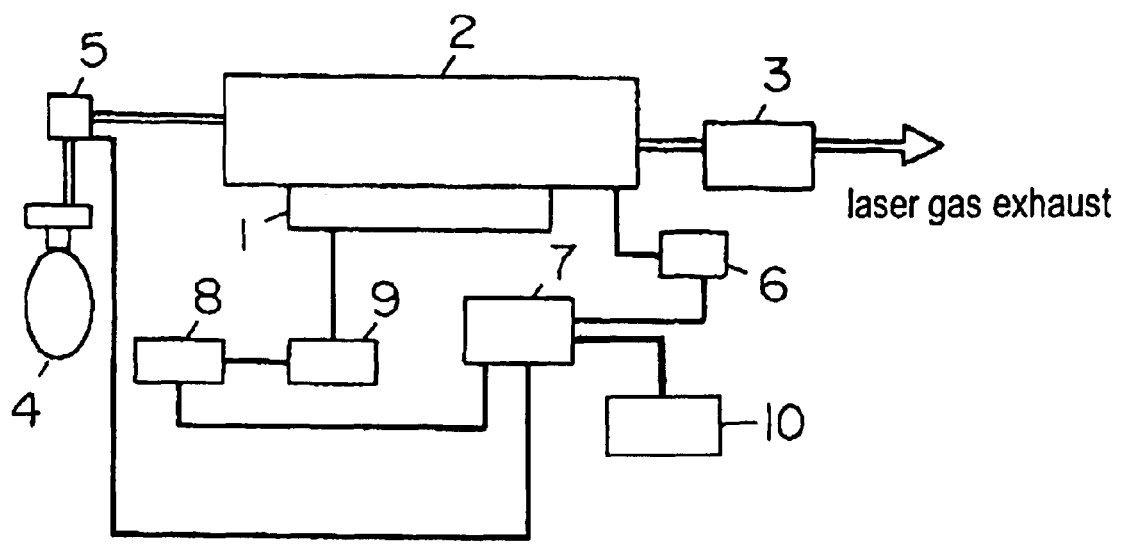
FIG. 1 shows structure of a gas laser oscillator in accordance with an exemplary embodiment of the present invention.

An exemplary embodiment of the present invention is described referring to the drawings.

Figure 2:
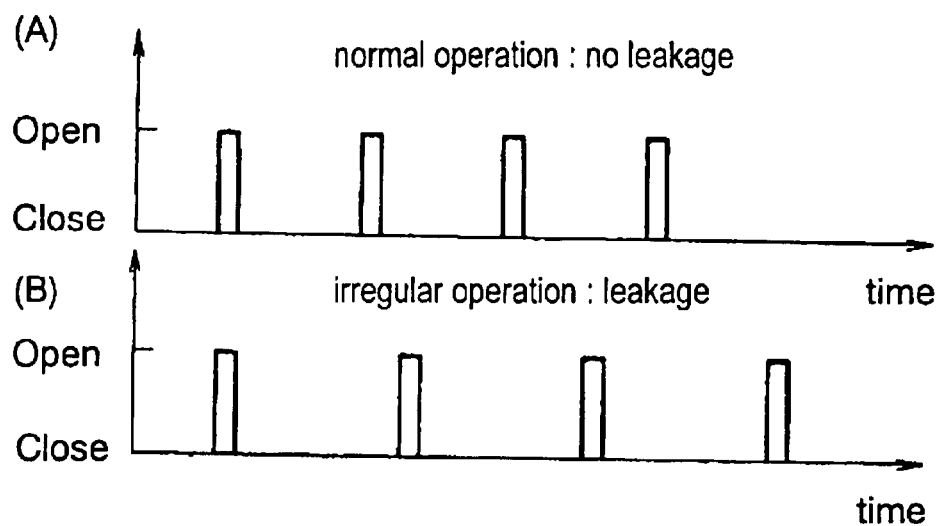
FIG. 2 is a chart used to describe the cycle period of open/close actions of an electromagnetic valve for supplying laser gas.
Figure 2:
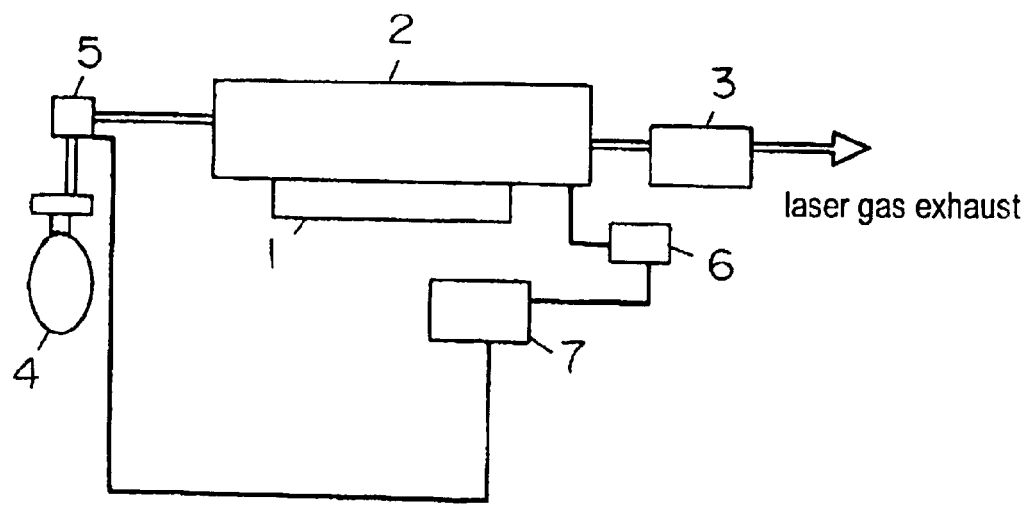

FIG. 1 shows outline structure of a gas laser oscillator in accordance with an exemplary embodiment of the present invention. FIG. 2 shows the cycle period of open/close actions of the electromagnetic valve 5 for supplying laser gas. Elements in FIG. 1 corresponding to elements in FIG. 3 are specified using the same reference numerals, and descriptions of which are omitted.

Referring to FIG. 1, the gas laser oscillator in the present embodiment is characterized in that it is provided with an alarm display controller 8 and a stop controller 9. Portion (A) of FIG. 2(A) shows the cycle period of open/close actions (i.e. the cycle period of open/close actions) for laser gas supply of the electromagnetic valve 5 during the time when the gas laser oscillator is working normally with the laser gas pressure within the laser gas chamber 2 kept constant. This represents that there is no vacuum leak. Portion (B) of FIG. 2 shows the cycle period of open/close actions of the electromagnetic valve 5 when there is a micro vacuum leak in the laser gas chamber 2, although it hardly ill-affects the laser output. It can be seen that the cycle period of open/close actions shown portion (B) of FIG. 2, representing that there is a micro vacuum leak, is longer than that of portion (A) of FIG. 2. This means that when there is a vacuum leak, the atmospheric air or similar substance creeps into the laser gas chamber 2 in addition to the laser gas. Namely, in normal gas laser oscillators, quantity of the laser gas to be exhausted by the vacuum pump 3 is fixed at a certain level; therefore, when a vacuum leak takes place, the cycle period of open/close actions for supplying the laser gas of the electromagnetic valve 5 becomes longer. In a gas laser oscillator of the present invention, means for detecting the cycle period of open/close actions of the electromagnetic valve 5 is provided; and when the cycle period detected becomes longer than a reference value, an alarm is issued. The alarm may be a display, a sound or a flashing light.

As seen from the comparison of FIG. 2(A) with FIG. 2(B), when a micro vacuum leak takes place within the laser gas chamber 2, the resultant deviation in the cycle period of open/close actions of the electromagnetic valve 5 is detected by a detector connected to the alarm display controller 8 via the laser gas pressure controller 7, and an alarm is issued. In the present embodiment, the amount of vacuum leak, whether it is great or small, is also detectable. Therefore, in a case when amount of the vacuum leak increased, the discharge for excitation can be stopped, if it is considered necessary, in order to prevent the optical components of the laser gas oscillator from being destroyed. The stop of discharge for excitation is conducted by the stop controller 9, which stops operation of the power supply 1 to stop power discharge for exciting the laser gas.

In the above-described example, difference in the cycle period of open/close actions of the electromagnetic valve 5 is detected by the detector 10 connected to the alarm display controller 8 via the laser gas pressure controller 7. It may be detected instead by a detector constituted by a separate counter for counting a number of open/close actions of the electromagnetic valve 5.

In accordance with the present invention, such a micro vacuum leak that hardly ill-affects the laser output can be detected with ease while gas laser oscillators are in operation. Detecting such micro vacuum leak was conventionally impossible. Thus, an abrupt oscillation stop can be prevented, and an appropriate maintenance procedure may be applied beforehand on vacuum seal. This contributes to providing reliable gas laser oscillators, and improving the overall efficiency of production activities which employ gas laser oscillators.

What is claimed is:

1. A gas laser oscillator comprising:
a laser gas chamber for containing laser gas;
a power supply for exciting the laser gas;
an exhaust device for exhausting the laser gas contained in said laser gas chamber;
a gas pressure sensor for detecting gas pressure in said laser gas chamber;
an electromagnetic value for supplying laser gas into said laser gas chamber in accordance with the gas pressure in said laser gas chamber as detected by said gas pressure sensor so as to maintain the gas pressure constant;
a detector for detecting a cycle period between open-and-close actions of said electromagnetic valve; and
an alarm display controller;
wherein said alarm display controller is operable to present an alarm when the cycle period becomes greater than a reference value.

2. The gas laser oscillator of claim 1, further comprising a stop controller for stopping supply of power from said power supply based on results of detection conducted by said detector.

3. The gas laser oscillator of claim 2, wherein the results of detection conducted by said detector are judged based on the cycle period between open-and-close actions of said electromagnetic valve.

4. The gas laser oscillator of claim 1, wherein said exhaust device comprises a vacuum pump.

5. The gas laser oscillator of claim 1, further comprising a laser gas pressure controller connected to said gas pressure sensor.

6. The gas laser oscillator of claim 5, wherein said detector is connected to said alarm display controller via said laser gas pressure controller.

7. A gas laser oscillator comprising:
a laser gas chamber arranged to contain laser gas;
a power supply arranged to provide power to excite the laser gas;
an exhaust pump coupled to said laser gas chamber to exhaust the laser gas from said laser gas chamber;
a gas pressure sensor arranged to detect gas pressure in said laser gas chamber;
a valve coupled to said laser gas chamber and being arranged to undergo an open-and-close action, based on detection of the gas pressure in said laser gas chamber by said gas pressure sensor, to selectively allow laser gas to be supplied into said laser gas chamber so as to maintain the gas pressure constant;
a detector for detecting a cycle period between open-and-close actions of said valve; and
an alarm controller operably coupled to said detector to present an alarm when the cycle period becomes greater than a reference value.

8. The gas laser oscillator of claim 7, further comprising a stop controller for stopping supply of power from said power supply based on results of detection conducted by said detector.

9. The gas laser oscillator of claim 7, wherein said valve comprises an electromagnetic valve.

10. The gas laser oscillator of claim 7, wherein said exhaust pump comprises a vacuum pump.

11. The gas laser oscillator of claim 7, further comprising a laser gas pressure controller connected to said gas pressure sensor.

12. The gas laser oscillator of claim 11, wherein said detector is connected to said alarm controller via said laser gas pressure controller.

* * * * *

UNITED STATES PATENT AND TRADEMARK OFFICE
CERTIFICATE OF CORRECTION

PATENT NO. : 6,768,761 B2
APPLICATION NO. : 09/795084
DATED : July 27, 2004
INVENTOR(S) : Hitoshi Hongu et al.

It is certified that error appears in the above-identified patent and that said Letters Patent is hereby corrected as shown below:

ON THE FRONT PAGE

In the abstract, line 1, "comprising" should read --comprises--;

in the abstract, line 6, "detecting that" should read --detecting when--;

in the abstract, line 8, "became longer" should read --become longer--;

in the abstract, line 13, "apply an appropriate" should read --apply appropriate--.

IN THE CLAIMS

In claim 1, column 4, line 3, "value" should read --valve--.

Signed and Sealed this

Sixth Day of March, 2007

JON W. DUDAS
*Director of the United States Patent and Trademark Office*